July 29, 1930.  W. GENSECKE  1,771,561
DISTILLATION
Filed June 16, 1925   2 Sheets-Sheet 1

Inventor:
Wilhelm Gensecke

Patented July 29, 1930

1,771,561

UNITED STATES PATENT OFFICE

WILHELM GENSECKE, OF BAD HOMBURG, GERMANY

DISTILLATION

Application filed June 16, 1925, Serial No. 37,520, and in Germany June 20, 1924.

The present invention relates to distillation operations and apparatus therefor in which steam is used as distilling medium, as for instance for treating fatty acids or for deodorizing oils.

Operations of the type referred to are commonly carried out by passing steam, preferably in the form of a spray, into the body of the liquid to be treated, at the bottom of the container, causing the steam to rise as bubbles to the surface of the liquid. It is a matter of experience that distillation takes place generally only at the surface of the liquid, i. e., the locus of the lowest pressure upon the liquid. The steam, aside from the fact that it has to travel through the whole body of the liquid, is effective only at or near the surface.

It is the general object of this invention to provide a mode of operation of distillation in which the distilling action of the steam is materially increased.

A more particular object of the invention is a mode of operation in which the liquid to be treated is brought into such intimate contact relation and under such conditions that the rate of distillation is materially increased.

For a full understanding of the invention and the principle of operation upon which it is based, reference is made to the accompanying drawings, in which Fig. 1 is a more or less diagrammatic representation of an apparatus for carrying out the object of the invention, Fig. 2 is a modification thereof;

Figure 1:
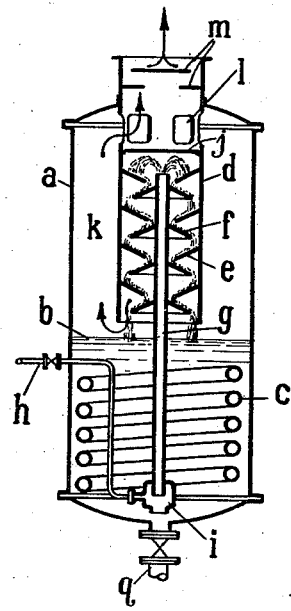

In Fig. 1, $a$ represents a distilling chamber in which the liquid is shown as having the level $b$. In the bottom portion of the chamber $a$ is provided the usual heating coil $c$. A pipe $g$, preferably centrally disposed in the chamber $a$, extends from near the top of the chamber to near the bottom thereof terminating at its bottom $t$ in a vessel $i$ which is open at its bottom and to which is connected a steam supply pipe $h$. The upper portion of the pipe $g$ is surrounded by a cylinder $d$ which extends through the top of the chamber $a$ and terminates a short distance above the level $b$. Slightly below the top of the chamber $a$ the cylinder $d$ has apertures $l$ which establish communication between the interior of the cylinder and the vapor space surrounding the same. Below the openings $l$ there is preferably provided in the cylinder $d$ in any suitable manner a transverse plate $j$ and below the latter are provided on the inner wall of the cylinder $d$ and on the pipe $g$ baffles $e$ and $f$ respectively. Above the openings $l$ there are preferably provided baffles $m$ in the cylinder $d$. The liquid may be introduced into and withdrawn from the chamber $a$ through the valve-controlled pipe $q$ at the bottom of the vessel.

The operation is as follows:

Steam entering through the pipe $h$ mixes with the liquid to be treated, in the vessel $i$ and in accordance with the principle of pneumatic lifts the mixture rises in the pipe $g$ and flows down over the baffles $e$, $f$ where distillation takes place under the most favorable conditions. The steam together with the distillate then passes upwardly through the vapor space surrounding the cylinder $d$ and through the openings $l$ out through the upper end of the cylinder to a condenser (not shown).

Thus liquid is continuously subjected to the distilling action of the steam under conditions most favorable to distillation. The steam is first intimately mixed with the liquid and then the mixture is subdivided by the contact devices represented by baffles $e$ and $f$ into films and streamlets promoting distillation in accordance with principles well known in connection with problems of evaporation and absorption.

The consumption of energy for effecting the lifting action is insignificant and in practice negligible. Due to the fact that steam has a very high specific volume, especially when the operation is conducted in a high vacuum, small amounts of steam may lift large amounts of liquid.

To fully understand the material points of the invention, it should be noted that attempts have heretofore been made to improve the distilling operation by lifting the liquid and allowing it to flow down through a column. However, such operation involved the use of mechanical pumps and a continuous substantial energy consumption incident thereto. In addition, the use of mechanical pumping mechanism is not well suited for apparatus of this type since the processes are, as a rule, carried out in a vacuum and in many cases, in a high vacuum.

In the present instance, the energy of the steam is utilized to lift the liquid, in contradistinction to old processes in which the steam is passed upwardly through the liquid without doing useful work.

A very material feature also is the liquid-gaseous contact relation effected by the invention. The steam and the liquid are caused to flow in the same direction in contact with each other both upwardly in the pipe $g$ and downwardly over the baffle system. This continued intimate contact is particularly effective for the purposes of distillation.

*Example.*—Deodorization of vegetable oil. The content of the distilling apparatus $a$ is 5,000 kg. The body of oil is heated by the coil $c$ to 160° C. The vacuum in the apparatus amounts to 10 mm. mercury absolute. The quantity of steam supplied by the vessel $i$ (Fig. 1) is 50 kg.; the steam enters at an absolute pressure which corresponds to the vacuum in the apparatus together with the liquid column, up to the inlet in the pipe $g$. The steam is thus under vacuum at the inlet point. Its temperature may amount to 160° C., superheated steam thus being involved. The mixture of oil and steam in the vessel $i$ is raised in the pipe $g$ and flows over the baffles $e$ and $f$ where continued intimate contact of the released steam and oil takes place under the most favorable conditions. The released steam, together with the distilled components of the oil, then passes upwards through the vapor space surrounding the cylinder $d$ and through the openings $l$ out through the upper end of the cylinder past the baffles $m$ to the condenser.

Practical experiment has demonstrated that under these operative conditions the apparatus can treat hourly about 75,000 kg. of oil. That is, the content of the still is supplied 15 times hourly. Whether the temperature of the steam is higher or lower than that of the oil treated is of no consequence, as the steam is superheated in each case and on rising in the pipe takes the temperature of the oil. With the maximum quantity of oil and the minimum quantity of steam the temperature of the oil is not appreciably influenced on change of the temperature of the steam.

To more completely utilize the steam, the distilling steam may be repeatedly used in a plurality of apparatus in series relation. However, since the steam passing from one apparatus into another is expanded, it is not suitable for lifting purposes and it is necessary to employ a small quantity of fresh steam for that purpose.

Figure 2:
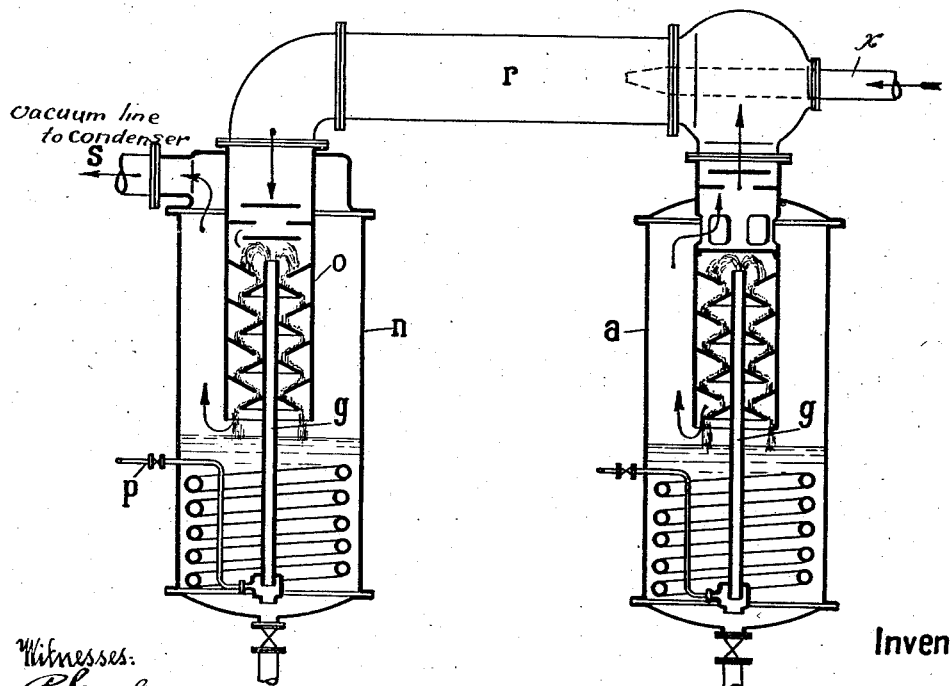

In Fig. 2 the distilling apparatus $a$ corresponds entirely to the apparatus just described. The steam carrying the distillate, however, does not pass directly to a condenser, but is conducted into a second apparatus $n$. The arrangement of parts of apparatus $n$ is essentially the same as that of apparatus $a$. Through steam pipe $p$ only so much steam is introduced as is necessary to lift the liquid in pipe $g$. The additional steam for adequately carrying out the distillation is the steam and distillate coming from the apparatus $a$ through conduit $r$ down through the cylinder $o$. Also in this case the steam flows with the liquid treated in the same direction. The mixture of steam and distillate passes out through outlet $s$. In the bottom part of the vessel $a$ is disposed a heating coil $c$.

To obtain in the chamber $a$ as high a vacuum as desired, it may be necessary to use a steam injector $x$ in the conduit $r$.

Figure 3:
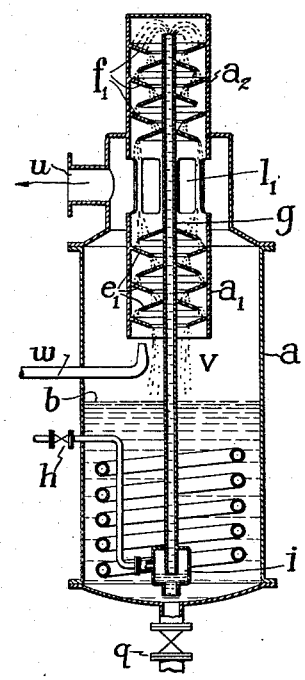
Fig. 3 is a fragmentary view showing another modification thereof.
Figure 4:
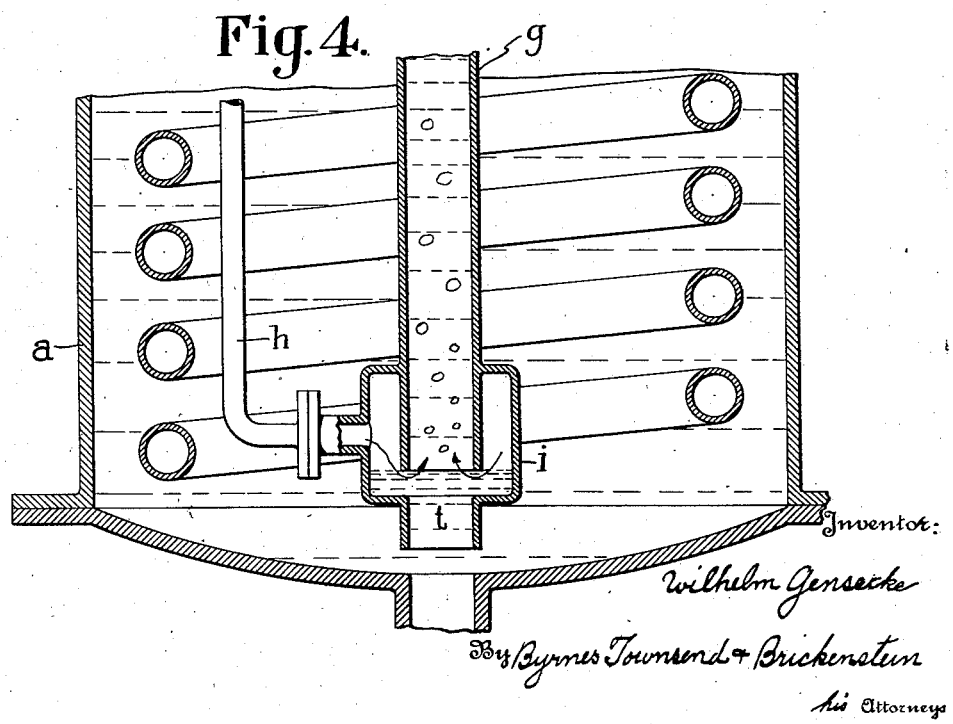
Fig. 4 is a more or less diagrammatic representation on an enlarged scale of the lower portion of the apparatus illustrated in Fig. 1.

While in apparatus of the single chamber type it is preferable to introduce all the steam through the steam supply pipe connected with the lift pipe, the operation may be carried out in other ways. Thus as shown in Fig. 3, the cylinder of the chamber $a$ is composed of two sections $a_1$ and $a_2$ containing baffles $e_1$ and $f_1$ respectively. Intermediate the two sections the cylinder is provided with openings $l_1$ which are in direct communication with the outlet $u$. Part of the steam may thus be used to lift the liquid through pipe $g$ and effect distillation in the upper section $a_2$ of the cylinder while steam may also be passed at a point $v$ upwardly into the lower section $a$ of the cylinder in countercurrent relation with the liquid descending through it. The introduction of steam into the lower section $a_1$ of the cylinder may be effected by admitting supplemental steam over the surface of the said body of oil through the port $w$. The steam so admitted finds outlet at the point $v$ and ascends through the lower section $a_1$ of the cylinder in countercurrent relation to the downwardly flowing oil. The steam descending in section $a_2$ and the steam ascending in section $a$ and the distillates carried thereby pass out through openings $l_1$ and the outlet $u$.

In the foregoing I have illustrated several forms of apparatus particularly suitable for carrying out the objects of the invention. However, it should be understood that the forms shown are merely general representative examples of apparatus by means of which the invention may be advantageously carried into execution.

The cylinder together with the baffles merely typify liquid-gaseous contact devices in general. It is understood that there is considerable latitude in respect to this feature.

The essential point is the lifting of the liquid to be treated by means of the steam and the action of the steam upon the liquid in a state of intimate surface contact.

I claim:

1. In the process for the elimination of odorous substances from liquid vegetable or animal oils, fats and the like by steam distillation, the steps which consist in continuously causing steam to pneumatically lift liquid oil from a body thereof to be treated and above the level of surrounding liquid, bringing the steam and the oil so lifted into intimate surface contact relation, and removing the steam and the gaseous products of the treatment.

2. In the process for the elimination of odorous substances from liquid vegetable or animal oils, fats and the like by steam distillation, the steps which consist in continuously causing steam to pneumatically lift liquid oil from a body thereof to be treated and above the level of surrounding liquid, bringing the steam and the oil so lifted into intimate surface contact relation, removing the steam and the gaseous products of the treatment, and allowing the so treated oil to return to the body thereof.

3. In the process for the elimination of odorous substances from liquid vegetable or animal oils, fats and the like by steam distillation, the steps which consist in continuously causing steam to pneumatically lift liquid oil from a body thereof to be treated and above the level of surrounding liquid, bringing the steam and the oil so lifted into intimate surface contact relation, withdrawing the steam and gaseous products of the treatment from contact with the oil, causing the oil to further descend counter-currently through a second stream of steam in intimate surface contact relation, withdrawing the steam and gaseous products of the treatment from contact with the oil, and allowing the so treated oil to return to the said body thereof.

4. In distillation of liquid by means of steam under conditions of sub-atmospheric pressure, the mode of operation which consists in causing steam to continuously lift liquid from a body of liquid to be treated and above the level of surrounding liquid, bringing the so-lifted liquid and steam into intimate surface contact relation and removing the steam and gaseous products of the interaction.

5. In distillation of liquid by means of steam under conditions of sub-atmospheric pressure, the mode of operation which consists in causing steam to continuously lift liquid from a body of liquid to be treated and above the level of the surrounding liquid, bringing the liquid lifted and steam into intimate surface contact relation, allowing the remaining liquid to return to the body of liquid and removing the steam and the gaseous products of the interaction.

6. In the process for the elimination of odorous substances from liquid vegetable or animal oils, fats and the like by steam distillation under conditions of sub-atmospheric pressure, the steps which consist in continuously causing steam to pneumatically lift the liquid oil from a body thereof to be treated and above the level of surrounding liquid, bringing steam and the oil so lifted into intimate surface contact relation, and removing the steam and the gaseous products of the treatment.

7. In the process for the elimination of odorous substance from liquid vegetable or animal oils, fats and the like by steam distillation under conditions of sub-atmospheric pressure, the steps which consist in continuously causing steam to pneumatically lift liquid oil from a body thereof to be treated above the level of surrounding liquid, bringing steam and the oil so lifted into intimate surface contact relation, removing the steam and the gaseous products of the treatment, and allowing the remaining oil to return to the body thereof.

8. In the process for the elimination of odorous substances from liquid vegetable or animal oils, fats and the like by steam distillation under conditions of sub-atmospheric pressure, the steps which consist in continuously causing steam to pneumatically lift liquid oil from a body thereof to be treated and above the level of the surrounding liquid, bringing the steam and the oil so lifted into intimate surface contact relation, withdrawing the steam and gaseous products of the treatment from contact with the oil, causing the oil to further descend counter-currently through a second stream of steam in intimate surface contact relation, withdrawing the steam and gaseous products of the treatment from contact with the oil, and allowing the so treated oil to return to the said body thereof.

9. In distillation of liquid by means of steam, the mode of operation which consists in causing steam to continuously lift a portion of the liquid from the body of liquid to be treated and above the level of surrounding liquid, bringing the so lifted liquid and steam into intimate surface contact relation and removing the steam and the gaseous products of the interaction.

10. In distillation of liquid by means of steam, the mode of operation which consists in causing steam to continuously lift a portion of the liquid from the body of liquid to be treated and above the level of surrounding liquid, bringing the so lifted liquid and steam into intimate surface contact relation, allowing the remaining liquid to return to the body of liquid and removing the steam and the gaseous products of the interaction.

In testimony whereof, I affix my signature.

WILHELM GENSECKE.